United States Patent Office 3,421,351
Patented Jan. 14, 1969

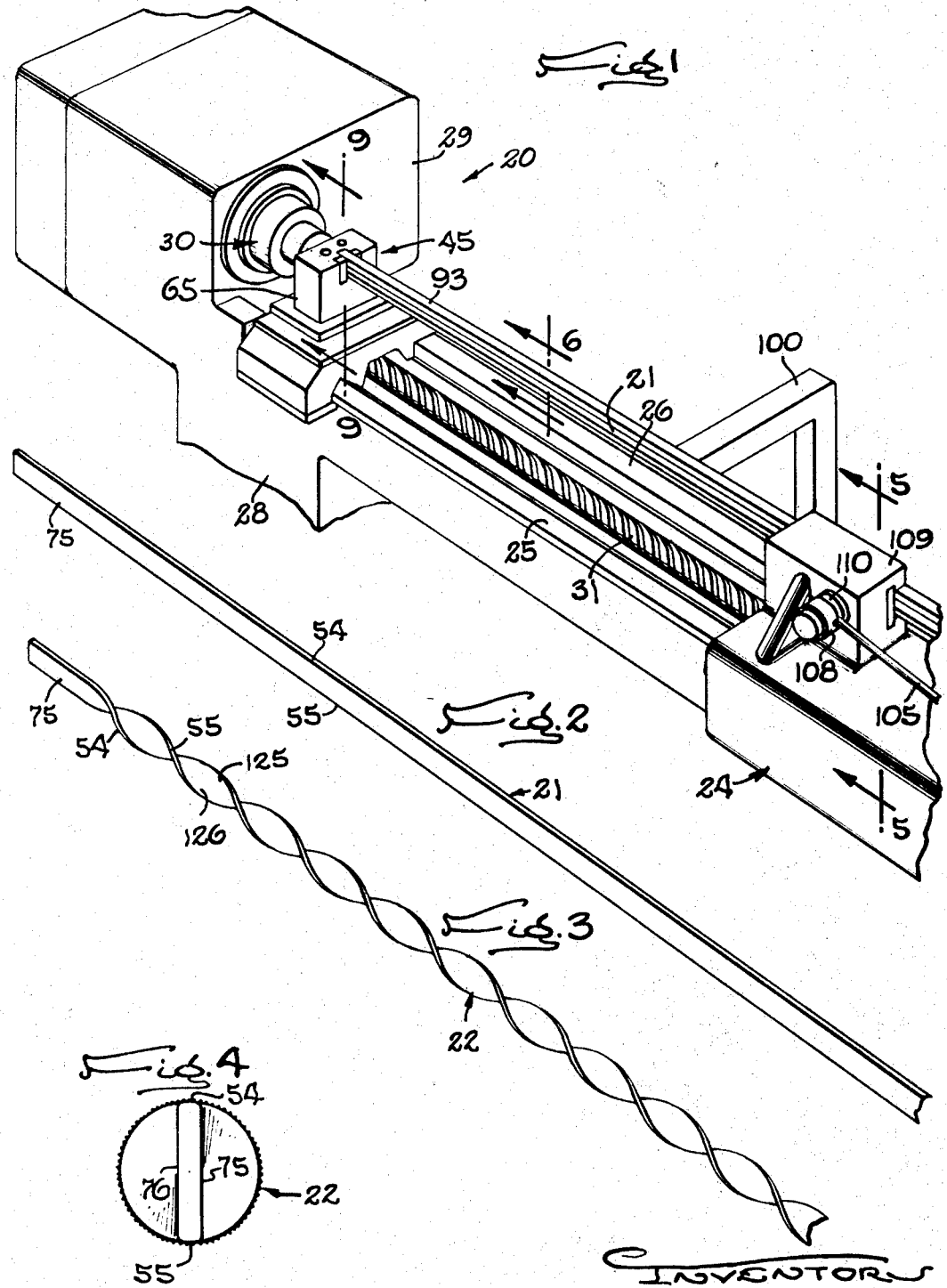

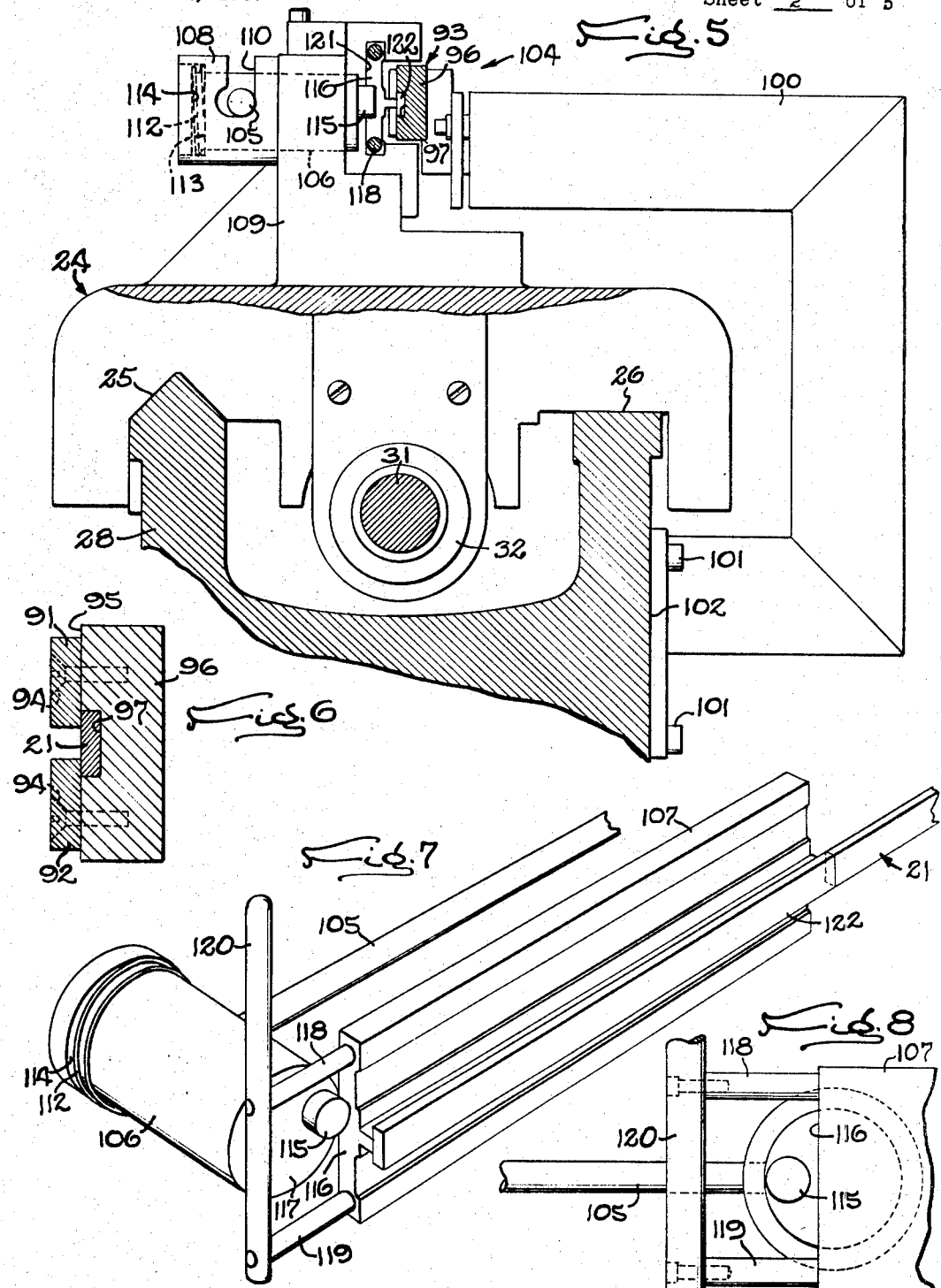

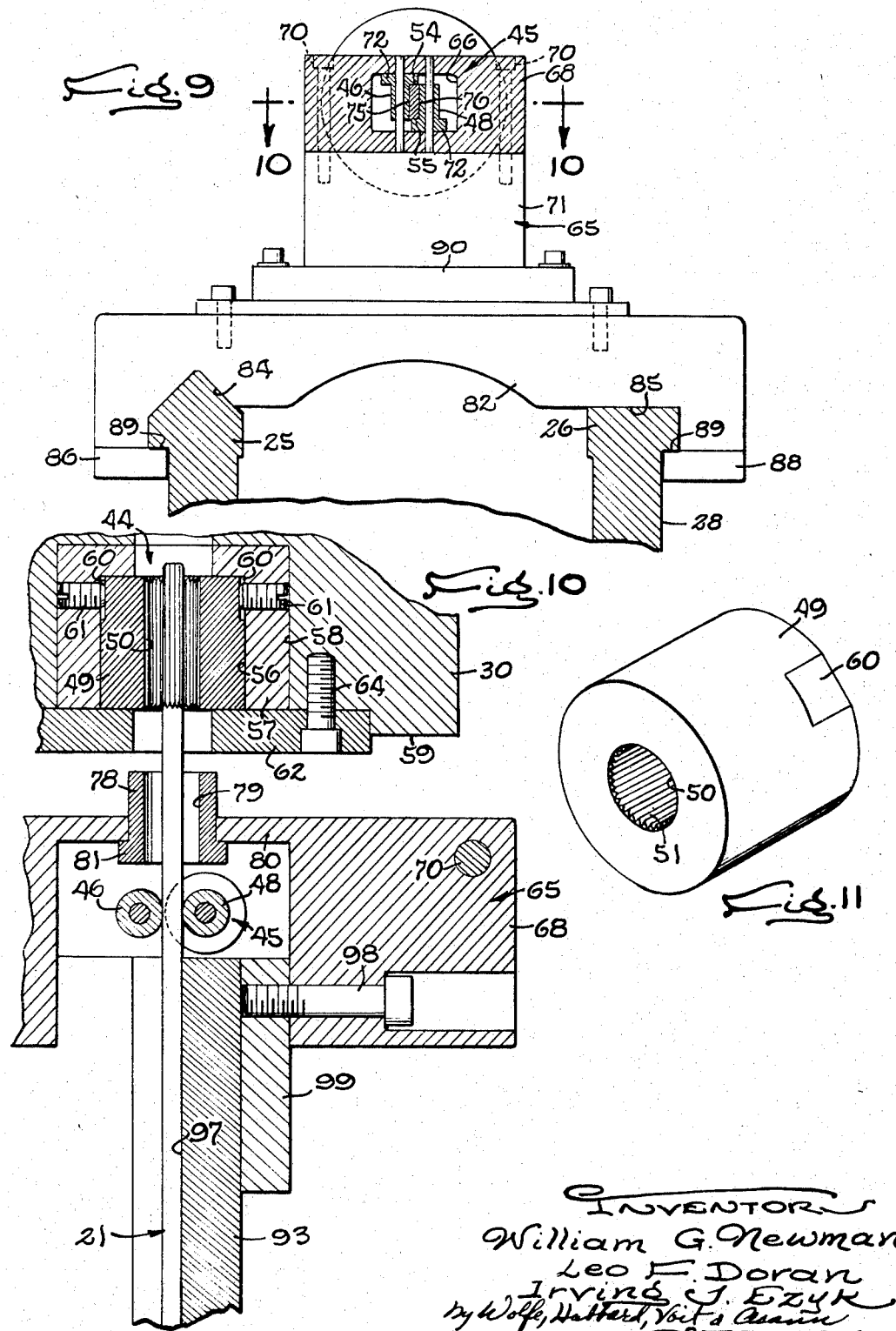

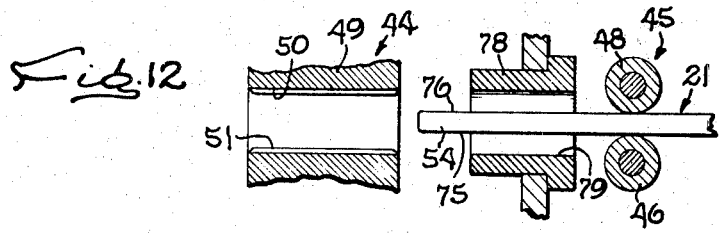
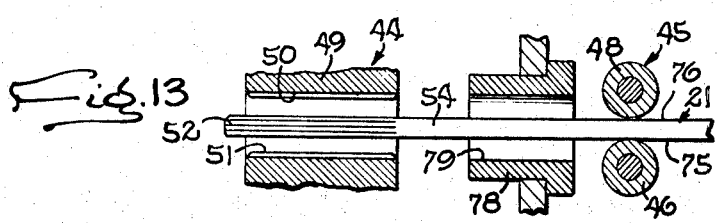
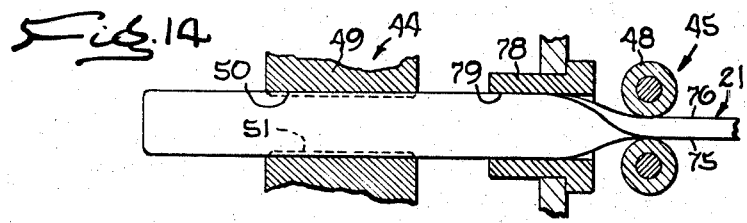
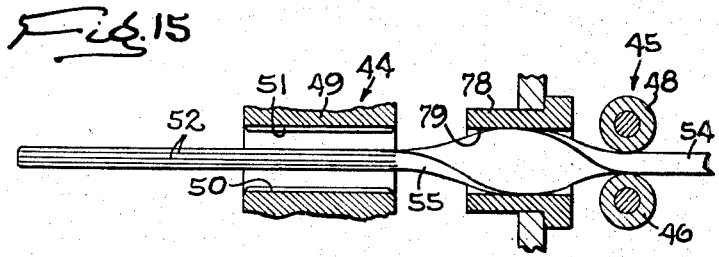
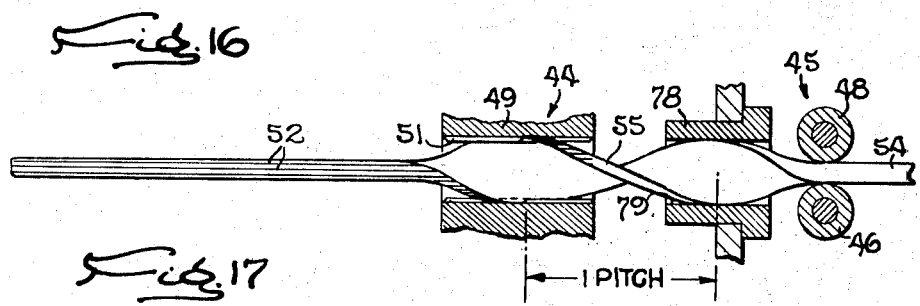
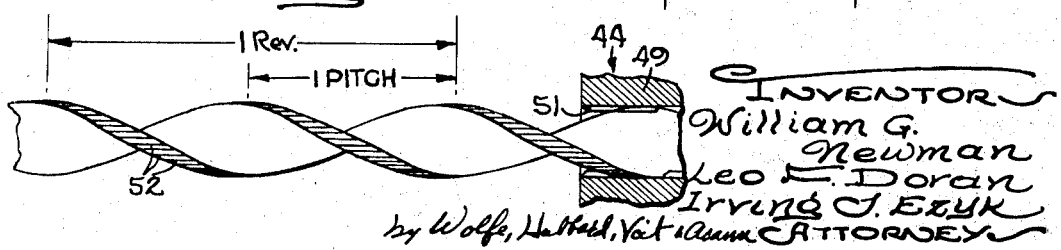

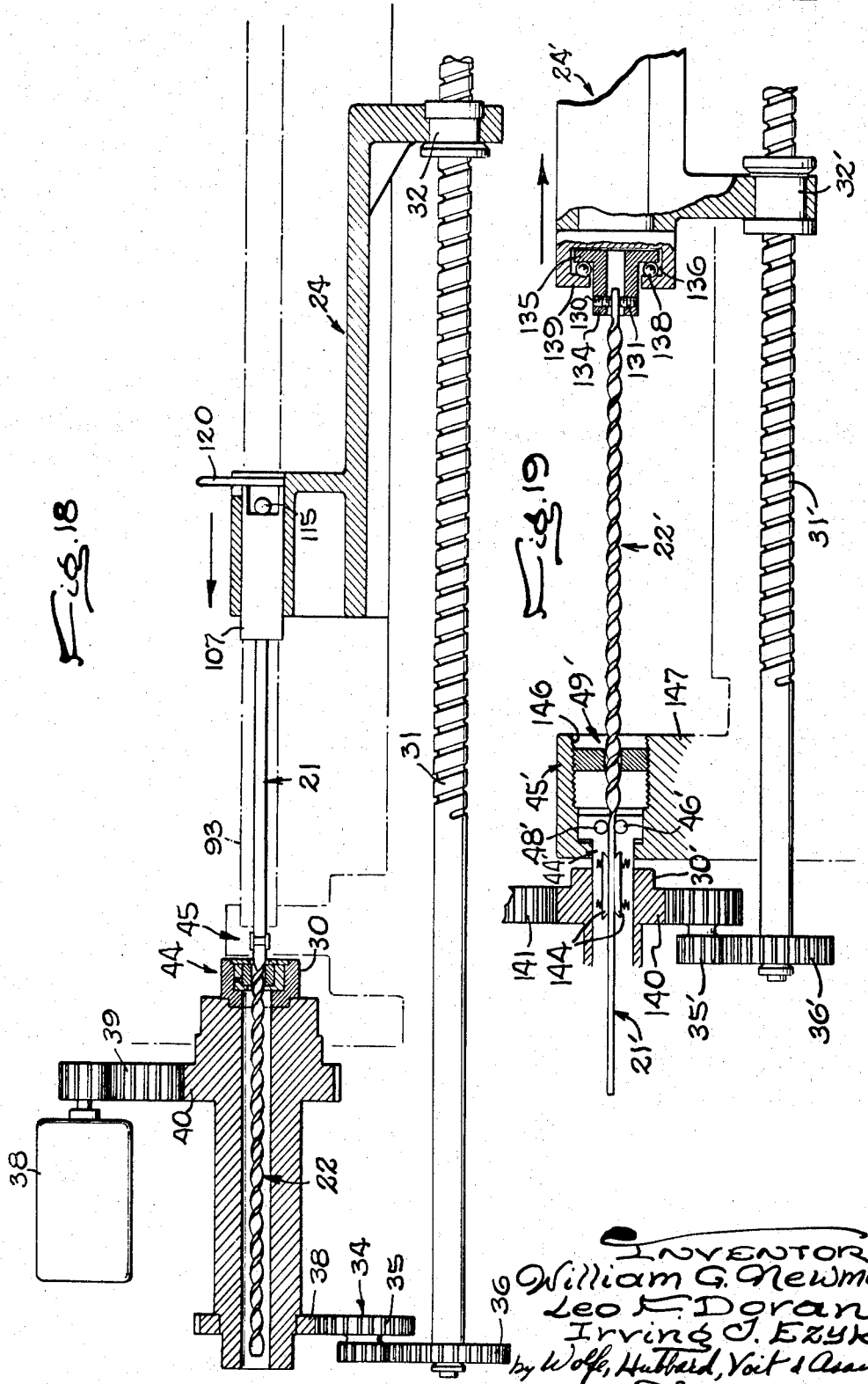

3,421,351
METHOD OF FORMING BAR SCREWS
William G. Newman, Oak Park, Leo F. Doran, Clawson, and Irving J. Ezyk, Utica, Mich., assignors to Beaver Precision Products, Inc., Clawson, Mich., a corporation of Delaware
Filed Feb. 2, 1967, Ser. No. 613,669
U.S. Cl. 72—64                    11 Claims
Int. Cl. B21b *15/02;* B21d *11/14*

ABSTRACT OF THE DISCLOSURE

A method and apparatus for twisting a bar of rectangular cross section to form a double lead screw of uniform pitch. The bar is held at one end by a first gripper which applies a twisting torque to the bar and, at a point spaced from the first gripper, a second gripper holds the bar against turning. The bar is advanced longitudinally through both grippers at a preselected speed and the first gripper is turned at a rate correlated with this speed to twist the bar to provide uniform turns of the desired pitch.

---

This invention relates to a method of and an apparatus for twisting stock into a spiral screw and more particularly to twisting bar stock into a commercially acceptable spiral screw having a uniform pitch and lead.

A general object of the invention is to produce spiral screws of relatively high quality and at a relatively low cost, as compared with prior methods, by twisting bar stock to form spiral screws having a uniform pitch and lead acceptable for use in relatively precise positioning mechanisms.

A more specific object of the invention is to twist bars of rectangular cross-section into a spiral configuration with consistent and uniform twists to produce commercially acceptable lead screws.

Another object of the invention is to produce accurate screws from bar stock by gripping the stock at axially spaced points in a work station and positively twisting the stock between the points as the stock is moved axially through the work station at a speed which is correlated with the twisting of the stock.

A further object of the invention is to grip the bar with grippers spaced axially along the bar at a fixed distance from each other and to twist the bar between the grippers while continuously moving the bar axially through the grippers at a preselected rate of movement.

Other objects and advantages of the invention will become apparent from the following detailed description taken in connection with the accompanying drawings, in which:

FIGURE 1 is a perspective view of a machine for twisting bar stock into a spiral screw and constructed in accordance with the preferred embodiment of the invention.

FIG. 2 is a perspective view of a bar having a rectangular cross-section for twisting into a screw with the machine of FIG. 1.

FIG. 3 is a perspective view of the screw formed from the bar of FIG. 2 by the machine of FIG. 1.

FIG. 4 is an end view of the screw of FIG. 3 formed while carrying out the invention and showing a plurality of axially directed serrations on the outer periphery of the screw.

FIG. 5 is a cross-sectional view taken substantially along the line 5—5 of FIG. 1 and showing a pusher carriage and its connection to a feed screw.

FIG. 6 is an enlarged sectional view taken substantially along the line 6—6 of FIG. 1 and showing a guide track for the bar of FIG. 2.

FIG. 7 is a diagrammatic and schematic view of the bar pusher in the pusher carriage.

FIG. 8 is a side elevational view of the bar pusher in FIG. 7 and shows the turning movement of a pusher pin of the bar pusher.

FIG. 9 is a sectional view taken substantially along the line 9—9 of FIG. 1 and showing flanged rollers for holding the trailing portion of the bar against rotation.

FIG. 10 is an enlarged sectional view taken substantially along the line 10—10 of FIG. 9 showing a bar inserted into annular, serrated gripper ring preparatory to twisting into a screw.

FIG. 11 is a perspective view of a gripper ring and its serrated bore.

FIGS. 12–17 are sectional and diagrammatic views showing sequential steps performed in inserting a bar into the grippers and twisting the bar during the first few revolutions through the annular gripper ring.

FIG. 18 is a diagrammatic view of a lathe machine equipped to practice the present invention.

FIG. 19 is a diagrammatic view of another embodiment of the invention in which the bar is pulled through the grippers on a lathe machine.

In the drawings, the invention is shown for purposes of illustration incorporated in a machine 20 for twisting stock such as the bar 21 into a helical screw 22 (FIG. 3) which has such a uniformly consistent pitch and lead that it is commercially acceptable as a lead screw for positioning mechanisms. The illustrated machine is a modified form of a lathe with a tail stock 24 (FIG. 1) supported on spaced parallel slideways 25 and 26 on a base 28 for sliding toward and away from a headstock 29 having a hollow center spindle 30. To reciprocate the tailstock at a predetermined rate, a longitudinal feed screw 31 is disposed parallel to the slideways and is threaded into a ball nut 32 (FIG. 18) depending from the right and rearward end of the tailstock. The spindle is rotated in timed relationship to each increment of feed of the tailstock by gearing 34 extending between the feed screw and the spindle as best seen in FIG. 18. The amount of axial feed of the tailstock for each revolution of the spindle can be changed by substituting change gears 35 meshed with gears 36 and 38 fixed to the ends of the lead screw and the spindle, respectively. The hollow spindle is rotated by a driving motor 38 geared through an idler 39 to a gear 40 fixed to the forward portion of the spindle. Thus, for each revolution of the spindle, the feed screw turns in the ball nut to advance the tailstock through a predetermined distance along the ways.

The tailstock 24 functions as a carriage to advance the bar 21 through the rotating spindle 30 at which a twisting torque is imparted to the bar spanning the carriage and the rotating spindle. The present invention is directed to producing precision screws having a relatively uniform pitch, i.e., distance between the threads, across the length of the screw thread, for example with a pitch tolerance of ±.004 to .005 of an inch. This is in contrast to screws which have non-uniform or progressively varying pitches due to the winding up of the stock during twisting.

In accordance with the present invention, screws 22 of relatively uniform pitch are formed by twisting the bar 21 between a pair of grippers 44 and 45 (FIG. 18) each of which holds the bar against turning relative to itself while one of the grippers is rotating relative to the other and twisting the bar at a preselected speed correlated with the speed at which the carriage 24 continuously advances the bar through both of the grippers. This is accomplished in the preferred embodiment of the invention by arranging the carriage 24 to push the bar to the left through the gripper 45 which herein is nonrotatable and through the gripper 44 which is rotated. In this instance, the gripper 45 is defined by a pair of rollers 46 and 48 (FIG. 10) engaging opposite sides of the bar while the rotatable gripper is a ring 49 with a serrated bore 50, the gripper ring being rotated by the spindle 30 through one revolution for a given amount of axial feed of the bar by the carriage.

To grip the bar with sufficient force to twist the bar without angular slipping movement between the bar and the grippers, different forms of grippers may be employed, but the ring 49 functions efficiently to grip the outer edges of twisted thread form with its axially extending serrations or teeth 51 biting into the bar. The teeth are spaced apart slightly less than the width of the bar which becomes the diameter of the formed screw so that the teeth cut longitudinal grooves 52 (FIG. 13) in the flat edges 54 and 55 (FIG. 3) of the bar. These axial grooves form axial teeth on the periphery of the screw and the teeth are removed in a later operation by a centerless grinder to prevent the teeth from cutting into the nut which encompasses and follows the screw thread in a positioning mechanism.

In order to turn the bar through a rotation with each rotation of the spindle, the gripper ring 49 is fixed to and rotates with the spindle 30. To this end, the gripper ring is set in an axial bore 56 (FIG. 10) in a holder 57 disposed in a recess 58 located centrally in an outer, vertical face wall 59 of the spindle. To hold the ring against rotation in the holder, flats 60 are formed diametrically opposite one another on the outer cylindrical surface of the ring for engagement with the inner ends of set screws 61 threaded through the holder. An outer surface of non-circular configuration on the holder seats in the complimentary-shaped recess 58 in the spindle and thereby interlocks the holder to the spindle for rotation with the latter. A retaining plate 62 is secured by cap screws 64 threaded in the face 59 of the spindle and extends radially over the outer ends of the ring and holder to prevent their displacement from the recess in the spindle. By removing the retaining plate and substituting another gripper ring having a bore differing in size from the bore of the gripper ring 49, a number of sizes and shapes of bar stock can be gripped.

In order to hold the portion of the bar 21 extending to the right against rotation by the gripper ring 49, the gripper rollers 46 and 48 are secured in a support holder 65 fixed on the slideways 25 and 26. The rollers are spaced on opposite sides of the bar and extend vertically in an axially extending recess 66 in a block 68 (FIG. 9) secured by cap screws 70 threaded into a base block 71 of the support holder. The bar is held and located vertically relative to the rollers by radially outward flanges 72 internally formed on the ends of the rollers and extending across the opposite smaller flat sides 54 and 55 of the bar while the longer flat sides 75 and 76 of the bar engage the cylindrical surface of the rollers. The diameter of the cylindrical surfaces is dimensioned to fit in the spiral groove of the threads being formed in the bar as the bar is being twisted. Preferably, the rollers are hardened to resist wear due to the pressures exerted thereon by the bar being twisted.

To guide the bar being twisted between the ring 49 and the rollers 46 and 48, an annular guide sleeve 78 (FIG. 10) projects from the holder 65 towards the spindle 30 and the bar extends through the bore 79 of the guide sleeve. The guide sleeve is disposed in a circular opening in a rear vertical wall 80 of the block 68 to be coaxial with the ring 49 and the bar 21 and a radially extending flange 81 on the guide sleeve is in engagement with the wall 80. The internal guiding bore 79 of the sleeve is sized to accommodate a given size of bar 21 and, to accommodate other sizes of bars, it is necessary to unthread cap screws 70 and replace the holder block 68 with another block having a different spacing between the rollers 46 and 48 and a different size of bore in the guiding sleeve 78.

An important aspect of the present invention is that the spacing between the grippers is held constant to achieve a uniform twisting in a bar moving forward across this spacing at a constant speed. To this end the spindle 30 carrying the gripper 44 is fixed in the headstock against axial movement and likewise the support holders 65 for the gripper 45 are held against axial movement. Specifically, the support holder for the gripper 45 is locked by set screws (not shown) threaded through the main support plate 82 (FIG. 9) to engage the base adjacent the slideways 25 and 26 (FIG. 9) on the base. The main support plate 82 on the holder rests on and spans the slideways 25 and 26 (FIG. 9) and portions 84 and 85 of its undersurface are complementary in shape to the upper surfaces of the slideways. Bars 86 and 88 are secured to the underside of the support plate and extend under shoulders 89 on the slideways to prevent lifting and tilting of the holder during a bar twisting operation. A horizontal plate 90 is secured to the top of the support block and, likewise, the support pedestal block 71 is secured on top of the support plate to hold the holder block and the rollers at the height to receive the bar between the flanges of the rollers. Thus, the holder is fixed to the base and is securely held to resist the large turning torques being applied by the bar to its gripper 45 during a bar twisting operation.

To prevent buckling of the bar stock while it is being pushed by the carriage 24 through the grippers 44 and 45, the bar stock is held and guided in a track 93 extending longitudinally from the tailstock 24 to the holder 65 and having a longitudinally extending passageway sized to encompass the bar stock on all four sides. Herein, the track is formed by a pair of vertically spaced longitudinally extending bars 91 and 92 (FIG. 6) secured by screws 94 against a vertical wall 95 of a main bar 96 having a central and longitudinal channel 97 in which the bar stock 21 is disposed. The left hand end of the guide track (FIG. 10) is secured by screws 98 and a bracket 99 (FIG. 10) to the holder block 68 to align the bar stock in the space between the rollers 46 and 48. Rightwardly and longitudinally of the holder block 68, the guide track is fixed to the upper end of a C-shaped bracket 100 (FIG. 5) which is secured at its lower end by bolts 101 to a vertical wall 102 of the base frame.

To load the bar in the machine, the bar is inserted through the open right end of the guide track 93 and slid forwardly to the gripper ring 49. The leading end of the bar 21 is forced manually into the serrated bore of the ring 49 while the ring is stationary. To this end, the carriage 24 is equipped with a bar pusher 104 which includes a manually operable lever 105 (FIG. 1) fixed to a cylinder 106 (FIGS. 6, 7 and 8) which when turned clockwise as seen in FIGS. 7 and 8, forces a slidable driver 107 to push the bar 21 forwardly along the guide track into the serrated bore thereby cutting the initial longitudinal serrations in the leading end of the bar. The cylinder is disposed in the bore of a sleeve 108 (FIG. 5) fixed to the pusher housing 109 upstanding from and fixed to the carriage 24. The lever 105 turns in an arcuate slot 110 extending arcuately for 180 degrees in the upper surface of the sleeve and the lever is limited to 180 degrees of turning by the slot. At one end of the slot is a leftwardly extending groove to receive the lever when the cylinder is forced to the left in the sleeve by a coiled spring 112. The latter encircles the outer end of the cylinder and is disposed between an annular shoulder 114 on the cylinder and an annular shoulder 113 formed in the sleeve at its outer, open end. The spring biases the cylinder leftwardly to retract a small cylindrical button 115 formed on the inner end 117 of the sleeve from extending into the passageway 97 in the pusher housing 109 and from engagement with a rear vertical wall 116 of the driver 107. The latter is guided for sliding longitudinally in a T-shaped slot 121 extending longitudinally in the pusher housing 109. Vertically spaced horizontal rods 118 and 119 are secured at one end to a vertical post 120 and are secured at their other ends to the driver 107. The post 120 affords a manual handle for positioning the driver 107 in place prior to turning the lever 105. From the foregoing, it will be appreciated that turning of the lever 105 in the cam slot 110 rotates the eccentrically mounted button 115 to engage and push the driver 107 to slide in the pusher housing 109 with a T-section driving bar 122 on the driver 107 sliding in the track 93 and forcing the bar 21 into and through the serrated teeth 51 in the ring 49, the movement of the bar being from its position in FIG. 12 to that illustrated in FIG. 13.

Because the bar is rectangular in the cross-section, the bar twists into a double start thread having two thread forms 125 and 126 (FIG. 3) each formed in one of the long flat sides 75 and 76 of the bar. One complete rotation of the bar 21 by the gripper ring 49 forms two complete twists or threads in the bar. Thus, two pitches are formed for each lead of the bar, the lead being the distance the screw or nut feeds axially during one complete rotation of the screw through a nut. The manner in which the bar twists into this form can be understood from the sequential twisting shown in FIGS. 13-17, inclusive. As the leading bar end is turned through 90 degrees between the horizontal (FIG. 13) and the vertical (FIG. 14) one-half of a thread turn is formed in the bar. When the bar has rotated through 180 degrees from the horizontal position of FIG. 13 to the horizontal position of FIG. 15, one complete twist or thread is formed in the bar and this is the first pitch (see FIG. 16). Thus, for 360 degrees rotation of the bar, two threads are formed in the bar and the amount of axial space covered by these two threads constitutes the lead (see FIG. 17). This lead has been carefully preselected by feeding the bar axially through a predetermined distance for this one revolution. Subsequent revolutions of the bar accompanied by a simultaneous axial feeding of the bar through the same increments results in a progressive twisting of the bar. When the opposite end of the bar reaches the rollers 46 and 48, the driving motor 38 is stopped and the now formed bar screw is removed.

When removed from the machine 10, the bar screw has a central twisted portion and two nontwisted ends which may be severed, if desired. Bar screws obtained under the present invention have a relatively constant pitch, usually within .004 to .005 of an inch, and a relatively constant diameter and are acceptable for most applications. Where greater accuracy is required, the bar screw may be straightened and corrected, as to lead, by a suitable apparatus.

Another embodiment of the invention is illustrated in FIG. 19, and similar or identical elements to those previously described are identified by the same reference characters which are primed in FIG. 19. The rectangular bar stock 21' (FIG. 19) is pulled rightwardly by the carriage 24' rather than being pushed as described above. The right end of the bar is gripped between opposed set screws 130 and 131 threaded in a flanged sleeve 134 and a flange 135 on the sleeve extends radially outward in an annular recess 136 formed on the left end of the carriage to engage a bearing 138 disposed between the flange and an encompassing, inwardly-directed, annular flange 139 on the carriage. This permits unrestrained angular or rotational motion of the bar already formed.

In order that the carriage 24' pull the bar 21' rightwardly in FIG. 19 through a preselected increment for each revolution of the bar, the feed screw 31' driving the carriage is suitably geared by gears 35' and 36' to a gear 140 which is fixed to the spindle and which is driven by a pinion gear 141 of a motor (not shown). The spindle 30' extends rightwardly and horizontally in FIG. 19 and carries a rotatable gripper 44' constituted by a pair of flanged rollers 46' and 48' similar in design to the rollers 46 and 48. The function of the rollers 46' and 48' is reverse from that described before in that the rollers 46' and 48' turn with the spindle and apply a twisting torque to the bar as it is being pulled rightwardly through the rollers. Also, mounted in the spindle are tension devices in the form of elongated friction shoes 144 spring biased against opposite flat sides of the bar to exert a retarding force on the bar as it enters the twisting rollers 46' and 48'.

The bar is held against rotation by a second gripper 45' in the form of a ring 49' having a serrated bore with teeth to cut axially directed striations on the outer surface of the spiral screw. In FIG. 19, the ring 49' holds the bar against rotation which is the reverse of the bar rotating function for the ring 49 above described. The ring 49' is externally threaded for threading into the threaded bore 146 of an upstanding frame support block 147 and suitable set screws (not shown) are threaded radially in the frame member to engage and hold the ring 49' against turning.

During the operation of the apparatus of FIG. 19, the carriage 24' pulls the right end of the bar stock 21' rightwardly with turning of the lead screw 31'. Simultaneously, the spindle 30' is turning and the rollers 46' and 48' are twisting that portion of the bar extending from the latter to the ring 49' which is gripping the outer surface of the now twisted bar and preventing the right end of the bar from rotating with the twisting rollers 46' and 48'. The bar screw is formed progressively as the carriage continues to move through lead increments with the formation of two screw threads for each revolution and each lead increment of feed.

It will be understood that the apparatus of both illustrated embodiments of the invention practice the method steps of the invention which are as follows: gripping the bar at a first position with a gripper such as the ring 49 or the rollers 46 and 48 and applying a twisting torque to the bar; gripping the bar and holding it against turning relative to a second gripping means such as the rollers 46' and 48' or with the ring 49' at a second position which is at a fixed axial distance from the first gripping means, advancing the bar continuously either by pushing or pulling the bar at preselected speed through the first and second gripping means, and rotating one of the gripping means at a speed correlated to the preselected feed to twist the bar through a consistent number of turns for each lead length of the bar thereby forming a progressively twisted bar.

From the foregoing, it will be seen that bar stock can be twisted uniformly to form a commercially acceptable spiral lead by practicing the method or using the exemplary apparatus described herein. It will be appreciated that the invention is equally applicable to forming screws from tubing as it is from bar stock.

I claim as my invention:

1. In a machine for forming a flat bar into a screw with a substantially uniform lead, the combination of, a first gripper adapted to engage the bar, a second gripper spaced a fixed distance from said first gripper and adapted to engage the bar, each of said grippers being operable to hold the bar against turning relative to the gripper while permitting the bar to move longitudinally through the gripper, means for rotating one of said grippers at a preselected speed relative to other of said grippers to twist the portion of the bar between the grippers, and means for advancing the bar longitudinally through the grippers at a speed correlated to the preselected speed of rotation in order to twist the bar uniformly and progressively along its length.

2. The machine of claim 1 in which one of said grippers is adapted to grip the outer circumferential edges of the twisted bar and to hold the bar against turning relative to it while the twisted bar slides longitudinally through said one gripper.

3. The machine of claim 2 in which axially extending teeth are formed on said one gripper for biting into the circumferential edges of the bar and to form axially extending striations on the outer circumferential edges of the twisted bar.

4. The machine of claim 2 in which the other gripper is defined by a pair of rollers spaced on opposite sides of the nontwisted portion of the bar to hold this portion against turning while it is advancing longitudinally through the rollers.

5. In a machine for twisting a bar to form a screw having a uniform pitch, the combination comprising, a frame, a drive in said frame including a rotatable drive sleeve and an axially extending feed screw, said drive sleeve alined axially to receive the bar and to permit the same to move therethrough, a carriage mounted on said frame for sliding movement in the axial direction and driven by said feed screw, means on said carriage adapted to engage the bar and to force the same to move axially through said drive sleeve, a torque applying gripper for engaging the bar and for applying a twisting torque to the bar while permitting the bar to slide axially therethrough with movement of said carriage, and a torque reactor gripper fixed to said frame at a predetermined distance from said torque applying gripper for holding the bar against turning and causing the bar to twist between the grippers while the bar feeds through both grippers to progressively form a screw.

6. The combination of claim 5 in which said carriage moves away from said torque reactor gripper and exerts a pulling force on said bar, said torque applying gripper includes a pair of rollers for rolling against opposite sides of the nontwisted portion of the bar as it is pulled between the rollers, and said torque reactor gripper includes an annular ring with a serrated bore for gripping the outer edges of the formed screw to hold the formed screw portion of the bar against turning.

7. The combination of claim 5 in which said carriage pushes said bar and moves toward said torque reactor gripper as the screw is being formed, said torque applying gripper includes an annular ring having a serrated bore for gripping the outer edges of the bar to twist the bar while the latter moves axially through the ring, and said fixed torque reactor gripper includes a pair of rollers for rolling against opposite sides of the nontwisted portion of the bar while permitting the bar to slide therethrough.

8. The machine of claim 5 including a longitudinal guide for the bar fixed to the frame and extending longitudinally along the bar and holding the sides of the bar against buckling while the bar is pushed through the grippers and twisted into a screw.

9. The machine of claim 8 in which the torque applying gripper has axially extending teeth spaced on opposite sides of the bar to bite into the bar, and further including manually operable means on the carriage for engaging the bar and sliding the bar through said guide and forcing the leading end of the bar into said teeth to couple said bar to the torque applying gripper.

10. The machine of claim 5 including change gearing coupling said drive sleeve and said feed screw whereby the axial feeding speed of the bar is preselected according to desired lead for the screw.

11. The method of twisting a bar of rectangular cross-section to form a double start screw thread of uniform pitch intermediate its ends, comprising the steps of, gripping the bar at one end with a gripping means for applying a twisting torque to the bar, holding the bar against turning with a holding means at a second position which is at a fixed distance axially along said bar and adjacent said first position, advancing the bar continually through the holding means and gripping means at a predetermined speed and rotating the gripping means at a speed correlated to the predetermined speed to achieve a consistent number of turns in the bar between the first position and second position with the bar being progressively twisted between its ends as it is being advanced.

References Cited

UNITED STATES PATENTS

| 127,436 | 6/1872 | Smith | 72—64 |
| 611,120 | 9/1898 | Hamilton | 72—64 |
| 1,263,896 | 4/1918 | Hutchinson | 72—65 |
| 1,463,594 | 7/1923 | Rust | 72—64 |

CHARLES W. LANHAM, *Primary Examiner.*

B. J. MUSTAIKIS, *Assistant Examiner.*